US012664269B2

(12) United States Patent
Lee

(10) Patent No.: US 12,664,269 B2
(45) Date of Patent: **\*Jun. 23, 2026**

(54) DETECTING AND PROTECTING AGAINST CYBERSECURITY ATTACKS USING UNPRINTABLE TRACKING CHARACTERS

(71) Applicant: Proofpoint, Inc., Sunnyvale, CA (US)

(72) Inventor: Thomas Lee, Kensington, CA (US)

(73) Assignee: Proofpoint, Inc., Sunnyvale, CA (US)

( \* ) Notice: Subject to any disclaimer, the term of this patent is extended or adjusted under 35 U.S.C. 154(b) by 44 days.

This patent is subject to a terminal disclaimer.

(21) Appl. No.: 18/610,402

(22) Filed: Mar. 20, 2024

(65) Prior Publication Data

US 2024/0232344 A1 Jul. 11, 2024

Related U.S. Application Data

(63) Continuation of application No. 17/324,997, filed on May 19, 2021, now Pat. No. 11,966,469.

(60) Provisional application No. 63/107,164, filed on Oct. 29, 2020.

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ......................... G06F 21/554; G06F 2221/034
See application file for complete search history.

(56) References Cited

U.S. PATENT DOCUMENTS

| | | | |
|---|---|---|---|
| 5,915,024 A | 6/1999 | Kitaori et al. | |
| 7,430,670 B1 * | 9/2008 | Horning .................. | G06F 21/14 |
| | | | 713/190 |
| 7,685,639 B1 | 3/2010 | McCorkendale et al. | |
| 9,411,785 B1 | 8/2016 | Wong et al. | |
| 12,062,013 B1 * | 8/2024 | Zhu ......................... | G06F 16/23 |
| 2004/0177110 A1 | 9/2004 | Rounthwaite et al. | |

(Continued)

FOREIGN PATENT DOCUMENTS

EP 1628448 A1 2/2006

OTHER PUBLICATIONS

Feb. 14, 2022—(EP) Extended Search Report—App 21199633.5.

*Primary Examiner* — Carl G Colin
*Assistant Examiner* — Zhe Liu
(74) *Attorney, Agent, or Firm* — Banner & Witcoff, Ltd.

(57) ABSTRACT

Aspects of the disclosure relate to detecting and protecting against cybersecurity attacks using unprintable tracking characters. A computing platform may receive a character-limited message sent to a user device. Subsequently, the computing platform may detect that the character-limited message sent to the user device includes suspicious content. Then, the computing platform may generate a modified character-limited message by inserting one or more special characters into the character-limited message and cause transmission of the modified character-limited message to the user device. Next, the computing platform may receive, from the user device, a spam report that includes the modified character-limited message. Then, the computing platform may identify a presence of the one or more special characters included in the modified character-limited message and adjust one or more filters based on the identification.

20 Claims, 8 Drawing Sheets

(56)           References Cited

U.S. PATENT DOCUMENTS

| | | | |
|---|---|---|---|
| 2004/0189682 A1 | 9/2004 | Troyansky et al. | |
| 2005/0144456 A1* | 6/2005 | Acharya | H04N 1/32187 |
| | | | 713/176 |
| 2006/0041622 A1 | 2/2006 | Qutub et al. | |
| 2006/0123479 A1 | 6/2006 | Kumar et al. | |
| 2010/0153394 A1 | 6/2010 | Wood | |
| 2013/0346333 A1 | 12/2013 | Hassler et al. | |
| 2014/0201094 A1* | 7/2014 | Herrington | G06V 20/80 |
| | | | 705/317 |
| 2016/0035060 A1 | 2/2016 | Lahmi et al. | |
| 2017/0316216 A1 | 11/2017 | Kim | |
| 2017/0329943 A1 | 11/2017 | Choi et al. | |
| 2018/0091453 A1 | 3/2018 | Jakobsson | |
| 2018/0113576 A1* | 4/2018 | Bauchot | G06F 40/166 |
| 2018/0191655 A1 | 7/2018 | Girdhar | |
| 2018/0278647 A1 | 9/2018 | Gabaev et al. | |
| 2019/0132273 A1 | 5/2019 | Ryan et al. | |
| 2019/0356623 A1 | 11/2019 | Everton et al. | |
| 2021/0117128 A1 | 4/2021 | Todd et al. | |

* cited by examiner

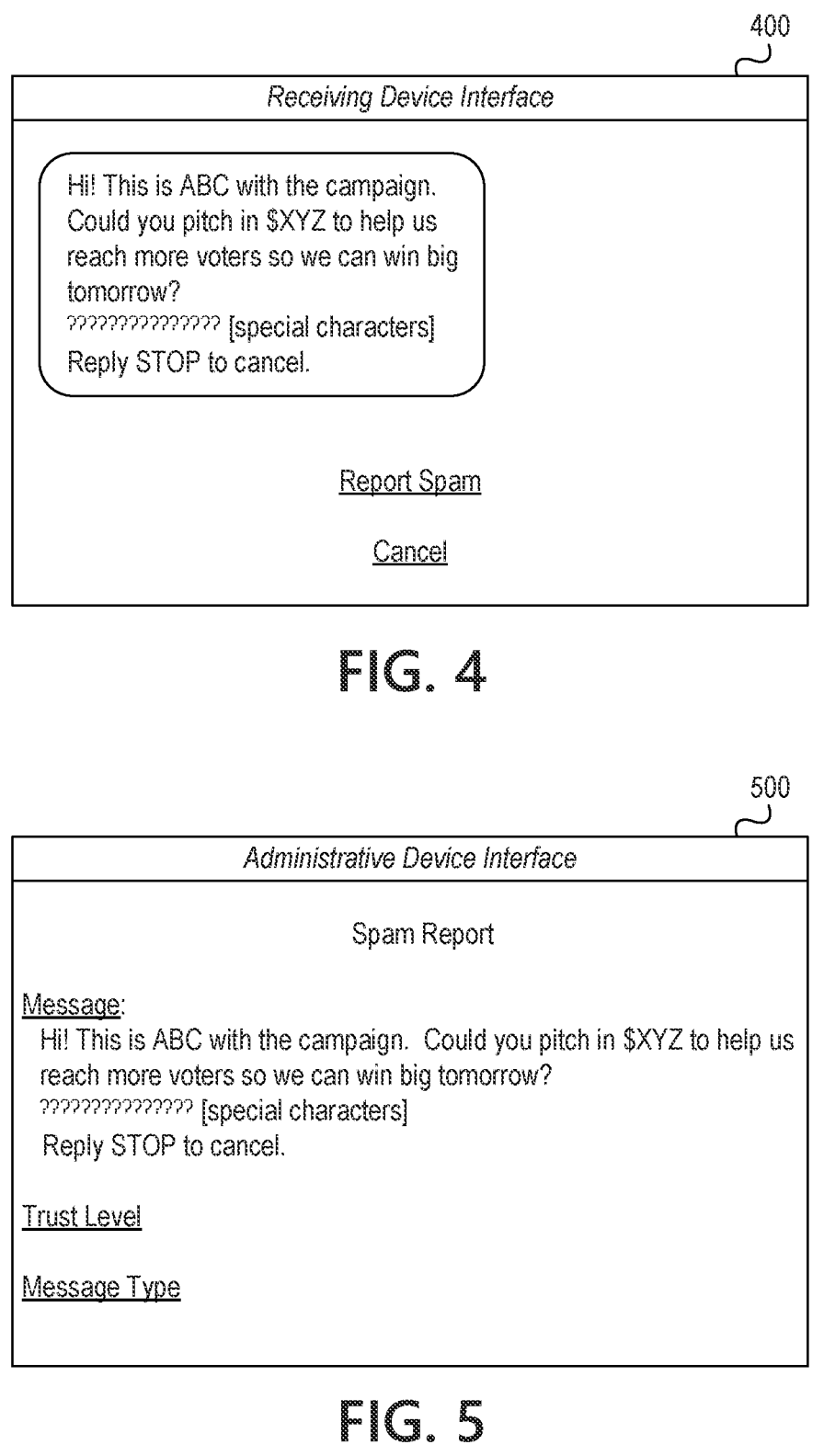

400

*Receiving Device Interface*

> Hi! This is ABC with the campaign. Could you pitch in $XYZ to help us reach more voters so we can win big tomorrow?
> ?????????????? [special characters]
> Reply STOP to cancel.

Report Spam

Cancel

*Administrative Device Interface*

Spam Report

Message:
Hi! This is ABC with the campaign.  Could you pitch in $XYZ to help us reach more voters so we can win big tomorrow?
?????????????? [special characters]
Reply STOP to cancel.

Trust Level

Message Type

FIG. 5

DETECTING AND PROTECTING AGAINST CYBERSECURITY ATTACKS USING UNPRINTABLE TRACKING CHARACTERS

CROSS-REFERENCE TO RELATED APPLICATIONS

This application is a continuation of and claims priority to U.S. application Ser. No. 17/324,997, filed May 19, 2021, and entitled, "Detecting and Protecting Against Cybersecurity Attacks Using Unprintable Tracking Characters," which claims the benefit of and priority to U.S. Provisional Patent Application Ser. No. 63/107,164, filed Oct. 29, 2020, and entitled "Inserting Unprintable Tracking Characters," all of which are incorporated by reference herein in their entirety.

TECHNICAL FIELD

Aspects of the disclosure relate to message processing and management systems, data processing methods, and communication systems and networks. In particular, one or more aspects of the disclosure relate to detecting and protecting against cybersecurity attacks using unprintable tracking characters.

BACKGROUND

Increasingly, organizations and individuals face various cybersecurity threats through electronic communications. Some increasingly common cybersecurity threats include spam or phishing messages, particularly those deployed through text messaging and other related communications. The techniques used by spammers and phishers have become more advanced in order to circumvent existing spam filtering products. In many instances, it may be difficult to track suspicious or questionable messages for efficient and effective combatting of cybersecurity threats deployed through these types of electronic communications.

SUMMARY

Aspects of the disclosure provide technical solutions that overcome one or more of the technical problems described above and/or other technical challenges. For instance, one or more aspects of the disclosure relate to receiving a character-limited message as it is being transmitted towards a user device, determining that the character-limited message includes suspicious content (e.g., is likely spam), modifying the character-limited message to include one or more special characters, causing the modified character-limited message to be delivered to an intended recipient, receiving a spam report that includes the modified character-limited message, identifying the one or more special characters included in the message, and adjusting one or more filters based on identifying the one or more special characters.

In accordance with one or more embodiments, a computing platform having at least one processor, a communication interface, and memory may receive, via the communication interface, a character-limited message sent to a user device. Subsequently, the computing platform may detect that the character-limited message sent to the user device includes suspicious content. Then, the computing platform may generate a modified character-limited message by inserting one or more special characters into the character-limited message and causing transmission of the modified character-limited message to the user device. Next, the computing platform may receive, via the communication interface, from the user device, a spam report that includes the modified character-limited message. Then, the computing platform may identify a presence of the one or more special characters included in the modified character-limited message. Thereafter, the computing platform may adjust one or more filters based on identifying the presence of the one or more special characters included in the modified character-limited message.

In some embodiments, the one or more special characters may include one or more unprintable characters.

In some embodiments, generating the modified character-limited message may include selecting and inserting different special characters, indicating different confidence levels, into the character-limited message.

In some embodiments, detecting that the character-limited message sent to the user device includes suspicious content may include determining a confidence level indicative of a degree to which the suspicious content is actually malicious, and inserting the one or more special characters into the character-limited message may include selecting at least one specific character for insertion based on the at least one specific character corresponding to the determined confidence level.

In some embodiments, the one or more special characters may indicate a type of messaging associated with the character-limited message sent to the user device.

In some embodiments, the computing platform may prior to detecting that the character-limited message sent to the user device includes suspicious content, classify the character-limited message based on message type.

In some embodiments, generating the modified character-limited message by inserting one or more special characters into the character-limited message may include: detecting a length of the character-limited message; and inserting the one or more special characters based on a number of available unused characters in the character-limited message.

In some embodiments, generating the modified character-limited message by inserting one or more special characters into the character-limited message may include: prioritizing the one or more special characters for insertion based on one or more criteria; and inserting the one or more special characters based on the prioritization.

In some embodiments, the character-limited message may include at least one of a short message service (SMS) message or a multimedia messaging service (MMS) message.

In some embodiments, adjusting the one or more filters may include modifying one or more filter criteria based on an aggregate of character-limited messages identified as including actually suspicious content.

In some embodiments, adjusting the one or more filters may include allowing relatively more of the character-limited messages to pass through to user devices.

In some embodiments, the computing platform may: receive, via the communication interface, an additional character-limited message sent to the user device; based on the adjusted one or more filters, detect that the additional character-limited message sent to the user device includes suspicious content; and based on detecting that the additional character-limited message sent to the user device includes suspicious content, execute one or more security actions.

In some embodiments, executing the one or more security actions may include blocking the additional character-limited message or inserting a warning message into the additional character-limited message.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4 and 5 depict example graphical user interfaces for detecting and protecting against cybersecurity attacks in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to improving security in electronic communications between users and/or communications sent from organization to users. One or more aspects of the disclosure thus provide technical solutions to various technical problems associated with detecting and protecting against cybersecurity threats in text messages (e.g., SMS messages). For example, inserting unprintable tracking characters into text messages may enable a cybersecurity server to track questionable messages and tune or otherwise refine message filters based on messages with these tracking characters subsequently being reported as spam. Additionally, solutions described herein may be used for messages that are edge cases under current classification models or that fall into gray areas in which it is preferable to err on the side of not blocking the message (e.g., political messages).

Figure 1:
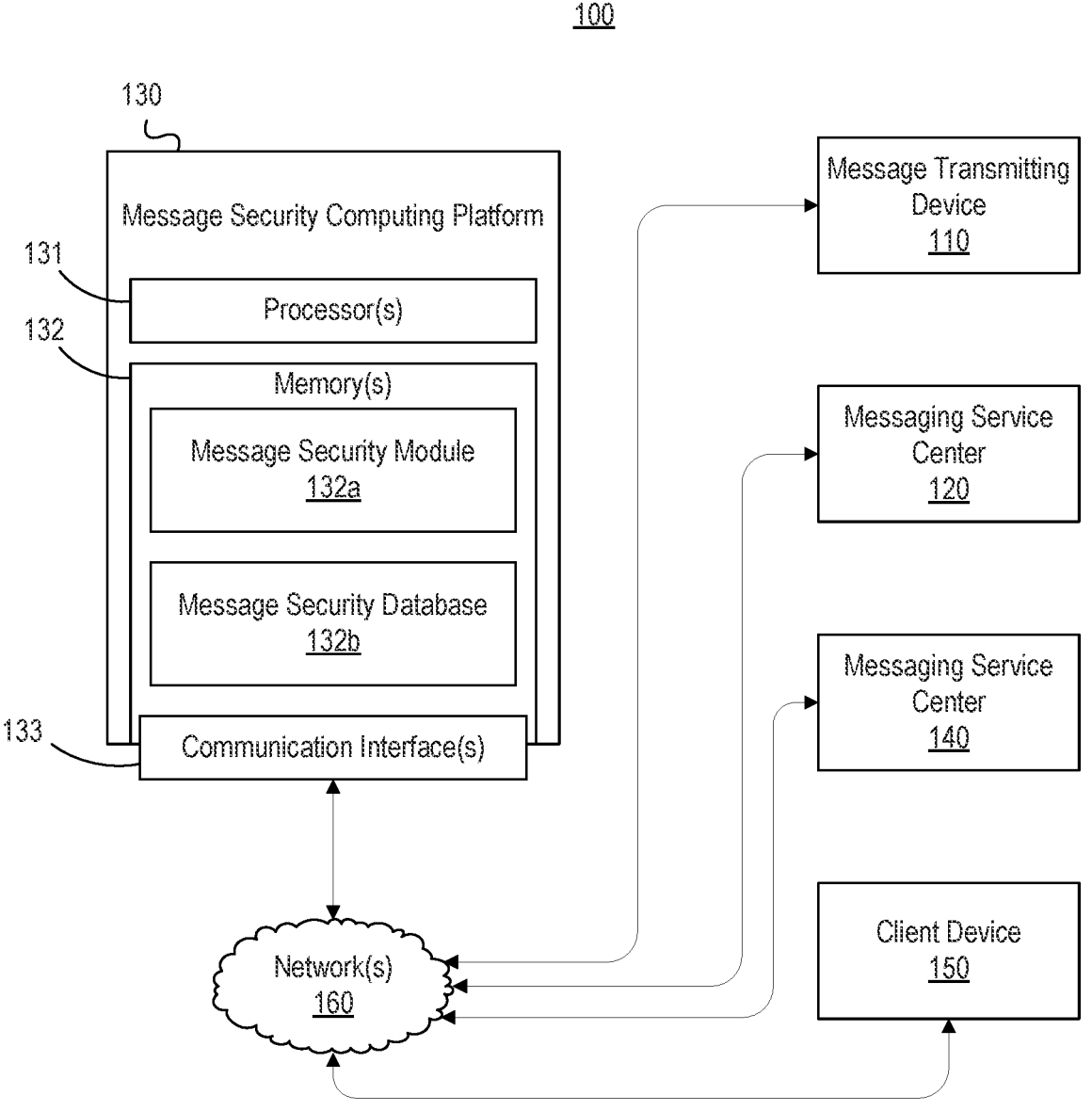
FIG. 1 depicts an illustrative operating environment for detecting and protecting against cybersecurity attacks in accordance with one or more example embodiments.

FIG. 1 depicts an illustrative operating environment for detecting and protecting against cybersecurity attacks in accordance with one or more example embodiments. Referring to FIG. 1, computing environment 100 may include various computer systems, computing devices, networks, and/or other operating infrastructure. For example, computing environment 100 may include a message transmitting device 110, messaging service centers 120 and 140, a message security computing platform 130, a client device 150, and one or more network(s) 160.

Network(s) 160 may include one or more wired networks and/or one or more wireless networks that interconnect the message transmitting device 110, messaging service centers 120 and 140, message security computing platform 130, client device 150, and/or other computer systems and/or devices. In addition, each of the message transmitting device 110, messaging service centers 120 and 140, message security computing platform 130, and client device 150, may be special purpose computing devices configured to perform specific functions, as illustrated in greater detail below, and may include specific computing components such as processors, memories, communication interfaces, and/or the like.

Message security computing platform 130 may include one or more processor(s) 131, one or more memory(s) 132, and one or more communication interface(s) 133. In some instances, message security computing platform 130 may be made up of a plurality of different computing devices (e.g., arranged as a computing platform), which may be distributed within a single data center or a plurality of different data centers. In these instances, the one or more processor(s) 131, one or more memory(s) 132, and one or more communication interface(s) 133 included in message security computing platform 130 may be part of and/or otherwise associated with the different computing devices that form message security computing platform 130.

In one or more arrangements, processor(s) 131 may control operations of message security computing platform 130. Memory(s) 132 may store instructions that, when executed by processor(s) 131, cause message security computing platform 130 to perform one or more functions, as discussed below. Communication interface(s) 133 may include one or more wired and/or wireless network interfaces, and communication interface(s) 133 may connect message security computing platform 130 to one or more networks (e.g., network 160) and/or enable message security computing platform 130 to exchange information and/or otherwise communicate with one or more devices connected to such networks.

In one or more arrangements, memory(s) 132 may store and/or otherwise provide a plurality of modules (which may e.g., include instructions that may be executed by processor(s) 131 to cause message security computing platform 130 to perform various functions) and/or databases (which may e.g., store data used by message security computing platform 130 in performing various functions). For example, memory(s) 132 may store and/or otherwise provide message security module 132a and message security database 132b. In some instances, message security module 132a may store instructions that cause message security computing platform 130 to execute one or more other functions described herein. Additionally, message security database 132b may store data that is used by message security computing platform 130 in executing one or more other functions described herein.

Message transmitting device 110 may be configured to send character-limited messages using a communications service (e.g., SMS). The message transmitting device 110 may be a client device used by a user (e.g., in the case of one user sending an SMS to another user) or alternately could be a non-user device. For example, server devices are often used to send character-limited messages to large numbers of users, e.g., for notification purposes, for spam purposes, or sometimes to send malicious content as part of a cybersecurity attack. The message transmitting device 110 thus may include any device that sends a character-limited message for any purpose.

Client device 150 may be configured to be used by respective users (who may e.g., be employees of an enterprise organization and/or customers of a communications service provider) to receive character-limited messages from the message transmitting device 110, as well as to send character-limited messages. The client devices could be user-owned devices, employer-provided devices, or other types of devices used by respective users. The client device 150 may be configured to present one or more user interfaces associated with messaging functions as described below.

As will be apparent to a person of ordinary skill, a communication system will have many client devices, and any given client device may be able to receive and send various types of messages, including character-limited messages, from and to any number of other devices, but the message transmitting device 110 and client device 150 described herein represent a respective sender and recipient in an example character-limited message transmission used to illustrate aspects of the disclosure. Thus, although the examples below describe the message transmitting device 110 sending exemplary character-limited message(s) to the client device 150, some aspects of the disclosure may include many client and/or message transmitting devices, all capable of sending various messages, including character-limited messages, to each other.

Messaging service centers 120 and/or 140 may be devices used by one or more communications service providers to forward electronic communications between devices, including to and from the message transmitting device 110 and the client device 150. As an example, the messaging service center may be and/or include an SMS-C (short message service center). The messaging service centers 120 and 140 may be located within communication networks that provide communication services to the message transmitting device 110 and/or client device 150. In one example, the messaging service center 120 may be part of a cellular or other network providing communications service to the messaging transmitting device 110, and the messaging service center 140 may be part of a cellular or other network providing communications service to the client device 150. In another example, both messaging service center 120, 140 may be part of a cellular network providing communications service to the client device 150, and the message transmitting device 110 might not have a wireless cellular communication.

Character-limited messages may include any message that can only fit a maximum number of characters in a single message. One example of a character-limited message is a short message service (SMS) message because SMS messages can only fit 160 characters in a single message. Similarly, a multimedia messaging service (MMS) message is a character-limited message. Alternatively, a character-limited message may be any type of message with a character limit, including character-limited messages sent using social media networks and/or websites, other types of character-limited text messages besides SMS/MMS, and/or instant messages with a character limit.

Figures 2A, 2B:
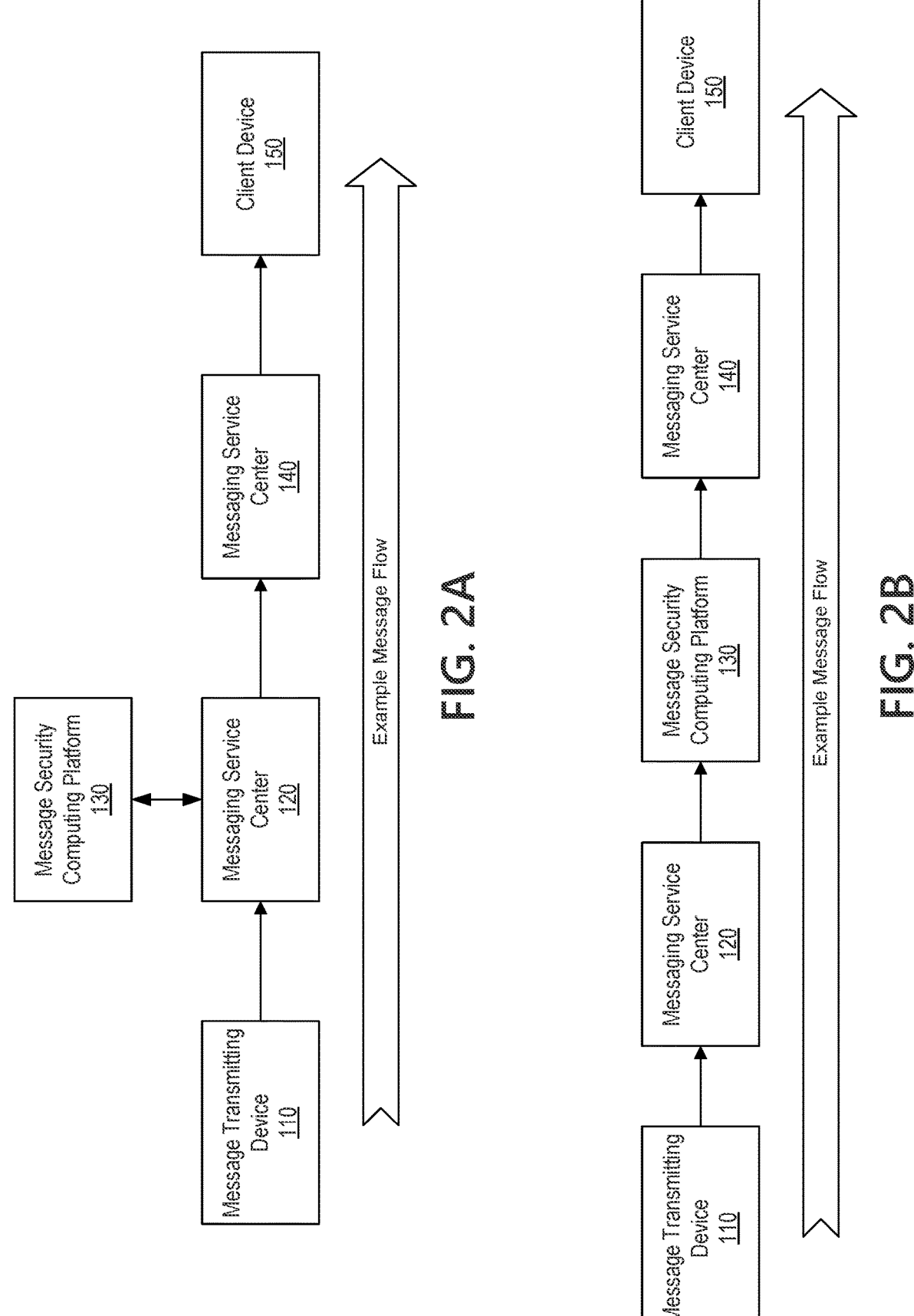
FIGS. 2A and 2B depict two illustrative logical flows for detecting and protecting against cybersecurity attacks in accordance with one or more example embodiments.

FIGS. 2A and 2B depict two illustrative logical flows for detecting and protecting against cybersecurity attacks in accordance with one or more example embodiments. Referring to FIG. 2A, in some cases message security computing platform 130 may be outside the message flow of one or more example character-limited message(s). In this example, the character-limited message(s) sent by the message transmitting device 110 to the client device 150 may be initially received by the messaging service center 120. As described in more detail below, the messaging service center 120 may be configured to, prior to forwarding the message(s) on to messaging service center 140, first send the received message(s) to the message security computing platform 130 for a security check and/or modification, and the message security computing platform 130, in turn, may be configured to respond by indicating the original message(s) should be dropped and new and/or modified character-limited message(s) should be injected instead, as further described in detail below. The messaging service center 120 would then forward the injected character-limited message(s) on to the messaging service center 140 for eventual delivery to the client device 150. Thus, in this example architecture, the message security computing platform 130 need not be tightly integrated into a communication provider network. Although FIG. 2A illustrates two messaging service center devices within the message flow, fewer or more messaging service center devices could be included in a flow (e.g., depending on the distance between the message transmitting device 110 and client device 150, a particular network architecture, whether the message is sent across networks or within a network, etc.). Additionally, other devices could be included a flow. Additionally or alternatively, the messaging service center 140 (instead of the messaging service center 120) could send the message(s) to the message security computing platform 130 for checking and/or modification.

Referring to FIG. 2B, in some cases the message security computing platform 130 may be within a message flow. In this example, the message security computing platform 130 may be integrated into one or more particular provider network(s), such that example character-limited message(s) may be received by the message security computing platform 130 from a message transmitting device 110 and/or messaging service center 120, and may then perform security checking and or modification before forwarding the new and/or modified message(s) on towards the client device 150 for delivery. Thus, in this example, the message security computing platform 130 may be tightly integrated into the messaging flow, which may be faster and more efficient.

Figure 3A:
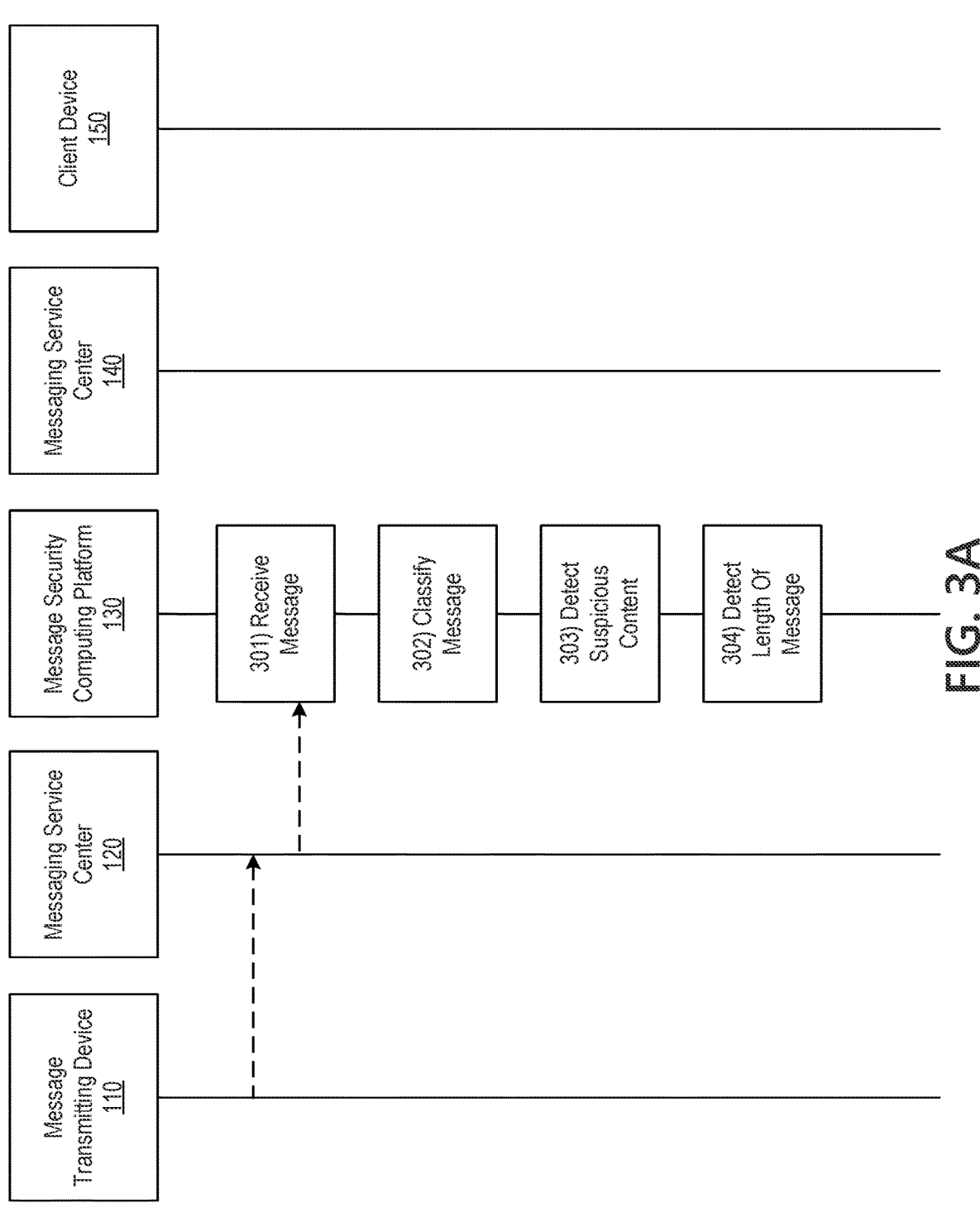
FIGS. 3A-3D depict an illustrative event sequence for detecting and protecting against cybersecurity attacks in accordance with one or more example embodiments.

FIGS. 3A-3D depict an illustrative event sequence for detecting and protecting against cybersecurity attacks in accordance with one or more example embodiments. Referring to FIG. 3A, at step 301, the message security computing platform 130 may receive, via a communication interface (e.g., communication interface 133), one or more character-limited messages for delivery to a user device (e.g., client device 150). In some cases, only a single message may be received at a time, and the message security computing platform 130 may follow the steps described below for each individual message separately. In some cases, multiple messages may be received together or shortly apart, and the message security computing platform 130 may act on the multiple messages together as part of the process described below. For example, if multiple messages are received within a time period (e.g., one second), the messages may be treated together. At step 302, the message security computing platform 130 may classify the character-limited message(s) based on message type (e.g., a political message, an informative message, an advertisement, a public safety message, a notification or alert message, a personal message, a botnet message, etc.). At step 303, the message security computing platform 130 may detect that the character-limited message(s) sent to the user device (e.g., client device 150) includes suspicious content. For example, the message security computing platform 130 may scan or evaluate the message for suspicious content and determine that the message is likely a spam message.

At step 304, the message security computing platform 130 may detect a length of the character-limited message(s). This information may be used later on to allow the message security computing platform 130 to modify the character-limited message(s) without going over the character limit for the message.

Figure 3B:
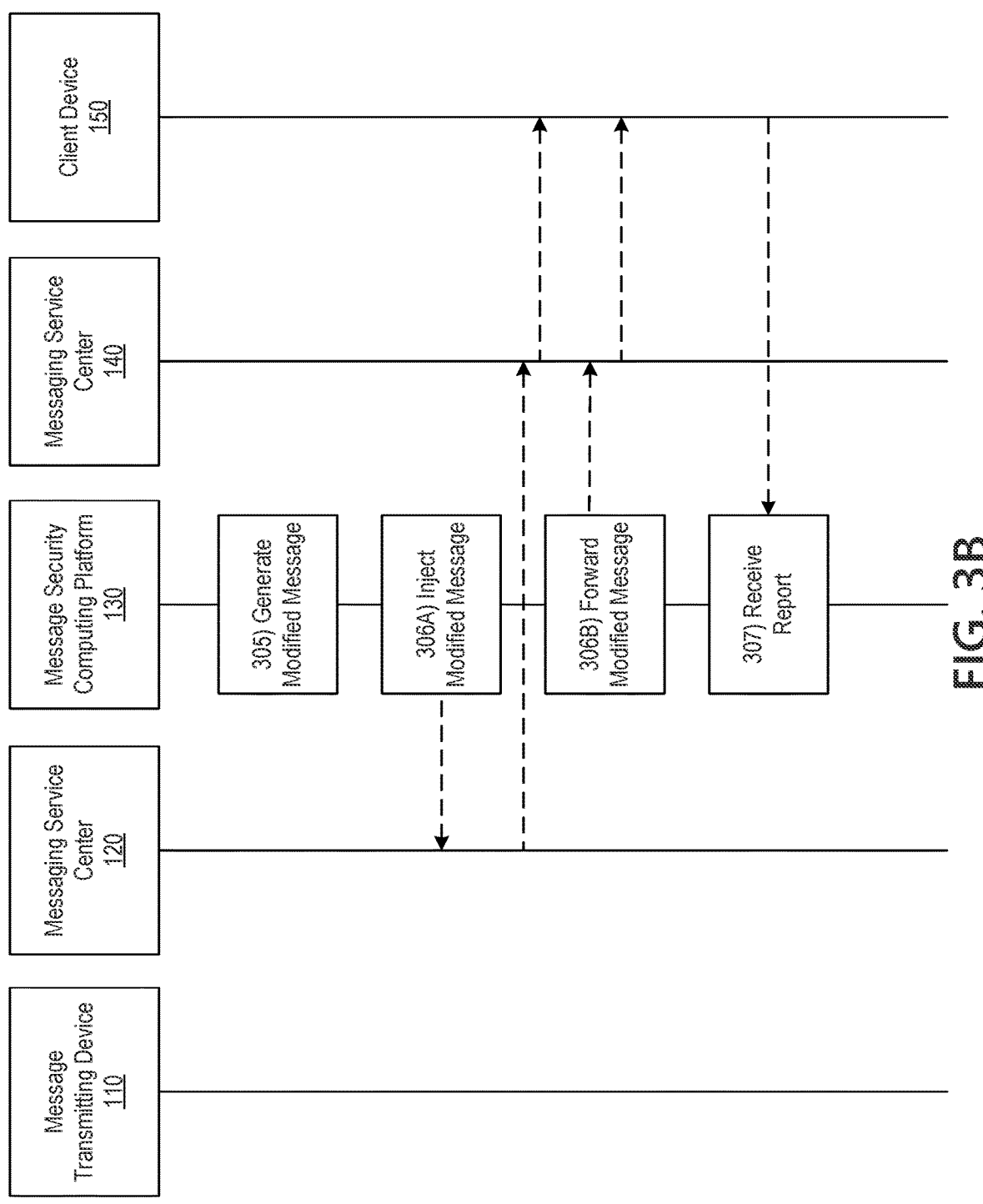

Referring to FIG. 3B, at step 305, the message security computing platform 130 may generate modified character-limited message(s) by inserting one or more special characters (e.g., identifiers) into the character-limited message(s). In addition, the one or more special characters may include one or more unprintable characters (e.g., hidden characters that are not visible, but are present, on a display device). Additionally or alternatively, the one or more special characters may include a glottal stop, a control character, a special letter or symbol (e.g., mathematical symbol, currency symbol), a punctuation mark, an accented letter, a letter from the European alphabet, a letter from the Greek alphabet, and/or the like. In addition, the message security computing platform 130 may insert the special characters at any location within the character-limited message(s) (e.g., at the beginning or the end of the message, or elsewhere in the message).

In some examples, in generating the modified character-limited message(s), the message security computing platform 130 may select and insert different characters, or different sets or sequences of characters (e.g., special characters), into the character-limited message(s) to indicate different confidence levels (e.g., high, medium, or low confidence that the suspicious content is actually suspicious) and/or classification results produced by the message security computing platform 130 when evaluating the message. Additionally or alternatively, in generating the modified character-limited message(s) by inserting one or more special characters into the character-limited message(s), the message security computing platform 130 may insert the one or more special characters based on a number of available unused characters in the character-limited message(s) (e.g., such that the one or more special characters can fit within a single message without going over the character limit for the message), thereby avoiding message subparts.

Additionally or alternatively, in generating the modified character-limited message(s) by inserting one or more special characters into the character-limited message(s), the message security computing platform 130 may select or prioritize the one or more special characters for insertion based on one or more criteria and insert the one or more special characters based on the prioritization. For instance, within a set of six special characters (e.g., identifiers), each special character indicating a different trust level of the message was when it was originally scanned, some identifiers may be prioritized. In addition, if there is only space to insert four special characters into the character-limited message (e.g., there are only four available unused characters in the character-limited message), then only four special characters may be selected and used.

In some examples, the one or more special characters (which may e.g., be selected and inserted by the message security computing platform 130) may indicate a type of messaging (e.g., application-to-person (A2P) messaging vs. person-to-person (P2P) messaging) associated with the character-limited message(s) sent to the user device (e.g., client device 150).

In some examples, in detecting that the character-limited message(s) sent to the user device (e.g., client device 150) includes suspicious content, the message security computing platform 130 may determine a confidence level indicative of a degree to which the suspicious content is actually suspicious. In addition, in generating modified character-limited message(s) by inserting one or more special characters into the character-limited message(s), the message security computing platform 130 may select at least one specific character for insertion based on the at least one specific character corresponding to the determined confidence level.

At steps 306A/306B, the message security computing platform 130 may cause transmission of the modified character-limited message(s) to the user device (e.g., client device 150). Step 306A may be performed in a system set up according to the example first architecture of FIG. 2A. In this example, the message security computing platform 130 is not part of the message flow, so the message security computing platform 130 may instruct the messaging service center 120 from which it received the one or more character-limited messages in step 301 to drop the original one or more character-limited messages and inject the modified one or more character-limited messages (e.g., as modified at step 305) into the message flow in place of the dropped message(s). Thus, the message security computing platform 130 may transmit one or more instructions to the messaging service center 120 to cause the replacement of the original message(s) with the modified message(s), and the messaging service center 120 in turn may then prevent transmission of the original message(s) to the user device (e.g., client device 150), and instead transmit the modified message(s) on to the next device in the message flow pathway (e.g., messaging service center 140), which in turn transmits the modified message(s) to the user device (e.g., client device 150). The one or more instructions may include the full content of the modified message(s) and/or instructions for how the messaging service center 120 can modify the original message(s) to obtain the modified message(s). For example, the message security computing platform 130 may indicate to the messaging service center 120 where one or more special characters should be placed and provide the one or more special characters, along with any other instructions for modifying the messages, or may simply send the modified message(s) in their entirety along with an indication of which message(s) the modified message(s) should replace.

As an alternative to step 306A, step 306B may be performed in a system set up according to the example second architecture of FIG. 2B. In this example, the message security computing platform 130 is part of the message flow, so the message security computing platform 130 may simply forward the modified character-limited message(s) to the next device (e.g., messaging service center 140) in the message flow pathway, which in turn sends the modified message(s) on to the user device (e.g., client device 150), which is the destination client device for the message(s).

At step 307, the message security computing platform 130 may receive, via the communication interface (e.g., communication interface 133), from the user device (e.g., client device 150), a spam report that includes the modified character-limited message(s). For example, after the modified character-limited message(s) is delivered (e.g., to client device 150), the recipient (e.g., user of the client device 150) may report the message as spam, confirming the receipt of a suspect message. The spam report may include the modified character-limited message(s) and/or a telephone number of the original sender. Information associated with the modified character-limited message(s) may be used later on to adjust one or more filters and/or block suspect messages, as described further herein.

Figure 3C:
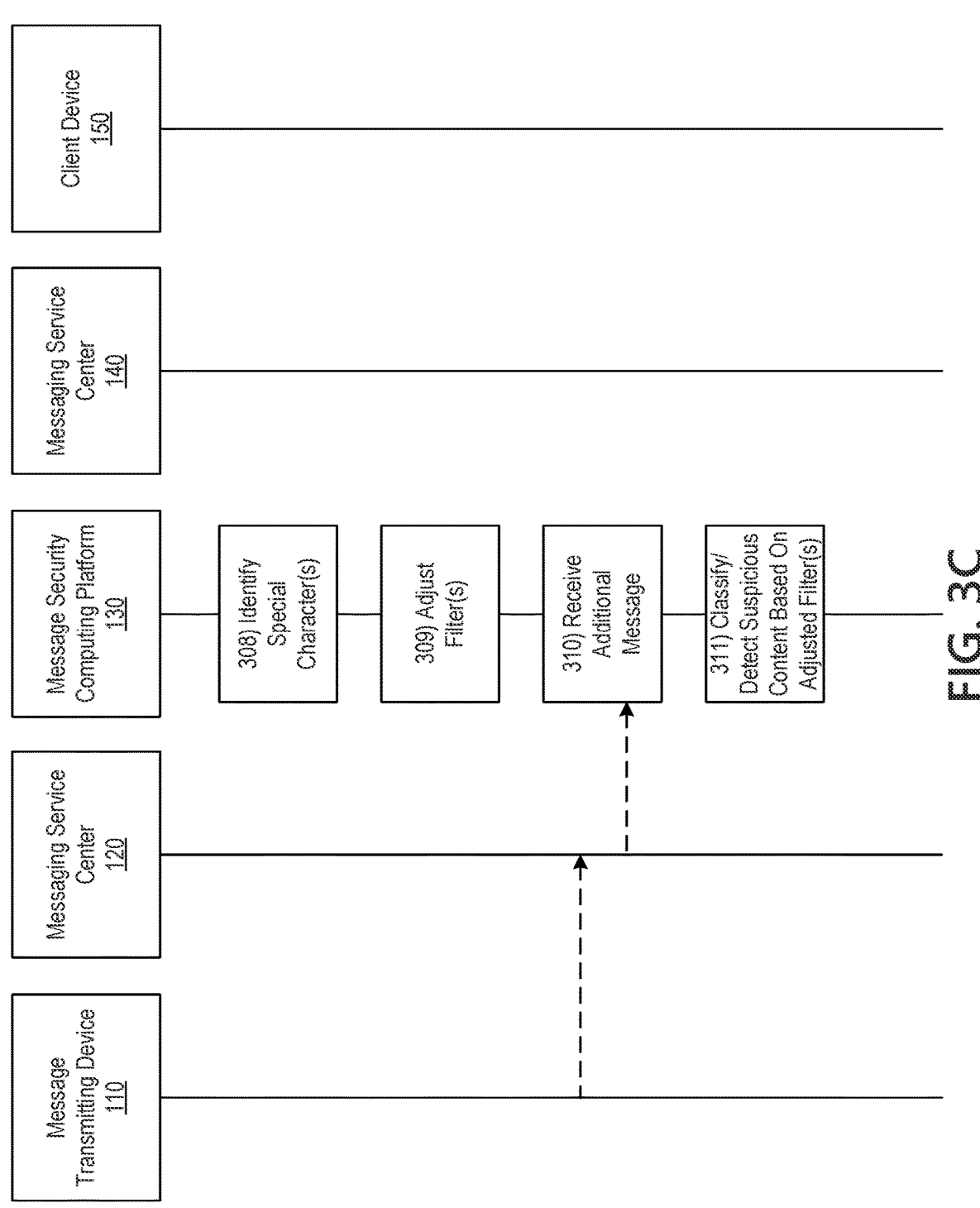

Turning to FIG. 3C, at step 308, the message security computing platform 130 may identify a presence of the one or more special characters included in the modified character-limited message(s). In some examples, the message security computing platform 130 may identify that the message includes one or more specific unprintable characters and may determine what the trust level of the message was when it was originally scanned, as well as what kind of traffic the message was identified as being (e.g., A2P vs. P2P). Advantageously, this approach may be computationally less expensive that going back and looking up details of the original message.

Based on identifying the presence of the one or more special characters included in the modified character-limited message(s), the message security computing platform 130 may at step 309, adjust (e.g., refine or tune) one or more filters. For example, the one or more special characters included in the message may indicate that the relative confidence level (e.g., that the message was likely a spam message) as determined at scan time, and the message security computing platform 130 may turn up or down one or more blocking filters based on confirming that the message is spam (e.g., based on its inclusion in the spam report). Accuracy in identifying suspect messages may be improved.

In some examples, adjusting the one or more filters may include modifying one or more filter criteria based on an aggregate of character-limited messages identified as including actually suspicious content. For instance, filters may be modified if and/or when groups of related and/or similar messages, with similar classifications and similar unprintable characters, are identified as spam. For instance, message security computing platform 130 may aggregate messages that are reported (e.g., at step 307) and identify recurring patterns within the reported messages.

In some examples, adjusting the one or more filters may include allowing relatively more of the character-limited messages to pass through to user devices. For instance, if the message security computing platform 130 is inserting these characters into many messages and not getting many spam reports back, the message security computing platform 130 may adjust the filter down to allow more questionable messages to be delivered. In some examples, the message security computing platform 130 may adjust the one or more filters based on local operator preferences.

At step 310, the message security computing platform 130 may receive, via a communication interface (e.g., communication interface 133), one or more additional character-limited messages for delivery to the user device (e.g., client device 150). At step 311, based on the adjusted one or more filters (e.g., as adjusted at step 309), the message security computing platform 130 may detect that the additional character-limited message(s) sent to the user device (e.g., client device 150) includes suspicious content. Thereafter, based on detecting that the additional character-limited message(s) sent to the user device (e.g., client device 150) includes suspicious content, the message security computing platform 130 may execute one or more security actions.

Figure 3D:
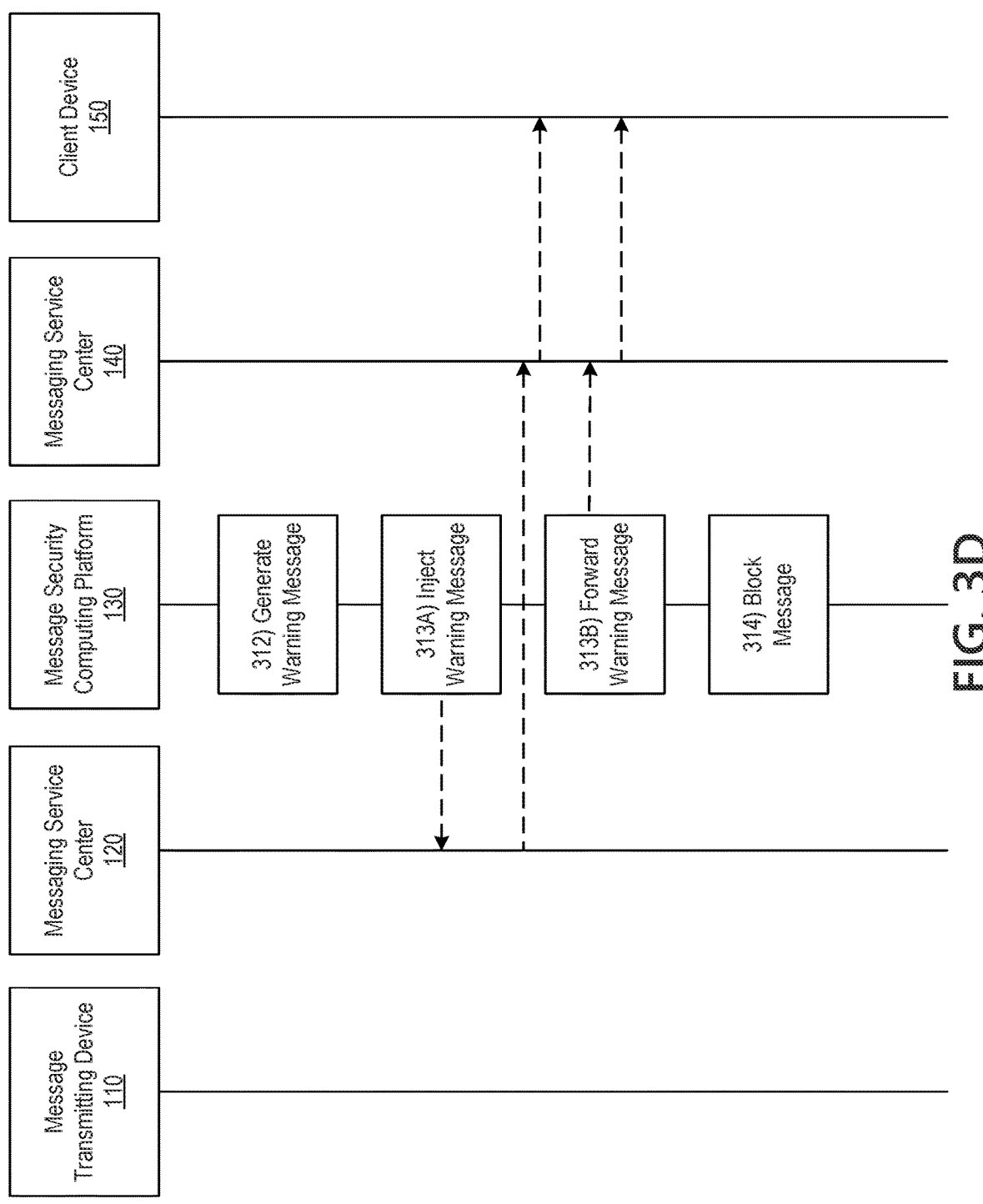

Referring to FIG. 3D, at step 312, for example, in executing the one or more security actions, the message security computing platform 130 may generate one or more warning messages, which may be injected into the actual character-limited additional message(s).

At steps 313A/313B, the message security computing platform 130 may cause transmission of the warning message(s) to the user device (e.g., client device 150). For instance, message security computing platform 130 may insert the warning message(s) before, after, or between text characters in the actual additional message(s). Alternatively, message security computing platform 130 may insert the warning message(s) in place of the actual additional message(s).

Step 313A may be performed in a system set up according to the example first architecture of FIG. 2A. In this example, the message security computing platform 130 is not part of the message flow, so the message security computing platform 130 may instruct the messaging service center 120 from which it received the one or more additional character-limited messages in step 310 to drop the actual one or more additional character-limited messages and inject a modified one or more additional character-limited messages (e.g., as modified by the warning message(s) generated at step 312) into the message flow in place of the dropped message(s). Thus, the message security computing platform 130 may transmit one or more instructions to the messaging service center 120 to cause the replacement of the actual additional message(s) with the modified additional message(s), and the messaging service center 120 in turn may then prevent transmission of the actual additional message(s) to the user device (e.g., client device 150), and instead transmit the modified additional message(s) on to the next device in the message flow pathway (e.g., messaging service center 140), which in turn transmits the modified additional message(s) to the user device (e.g., client device 150). The one or more instructions may include the full content of the modified additional message(s) and/or instructions for how the messaging service center 120 can modify the actual additional message(s) to obtain the modified additional message(s). For example, the message security computing platform 130 may indicate to the messaging service center 120 where one or more warning messages should be placed and provide the one or more warning messages, along with any other instructions for modifying the additional message(s), or may simply send the modified additional message(s) in their entirety along with an indication of which additional message(s) the modified additional message(s) should replace.

As an alternative to step 313A, step 313B may be performed in a system set up according to the example second architecture of FIG. 2B. In this example, the message security computing platform 130 is part of the message flow, so the message security computing platform 130 may simply forward the modified additional character-limited message(s) (e.g., which may include the warning message(s)) to the next device (e.g., messaging service center 140) in the message flow pathway, which in turn sends the modified additional message(s) on to the user device (e.g., client device 150), which is the destination client device for the additional message(s).

Additionally or alternatively, at step 314, the message security computing platform 130 may block the additional character-limited message(s) (e.g., received in step 310) altogether. For example, the message security computing platform 130 may prevent (e.g., entirely prevent or limit) transmission of the additional character-limited message(s) to the user device (e.g., client device 150).

FIGS. 4 and 5 depict example graphical user interfaces for detecting and protecting against cybersecurity attacks in accordance with one or more example embodiments. In particular, FIGS. 4 and 5 illustrate several aspects of the disclosure described above. FIG. 4 shows a potential graphical user interface 400 that may be used by a receiving device (e.g., client device 150) the receives an example message after the message is modified by the message security computing platform 130. As illustrated in FIG. 4, in the example message, the message security computing platform 130 inserted special characters (e.g., glottal stops "??????????????") into the message (e.g., to the end of the message), as described in the process of FIGS. 3A-3D. It will be appreciated that other and/or different unprintable tracking characters and arrangements thereof may also be provided.

FIG. 5 shows a potential graphical user interface 500 that may be used by an administrative device (e.g., of message security computing platform 130) that receives a spam report (e.g., from client device 150). As illustrated in FIG. 5, the spam report may include information such as the modified one or more character-limited messages (e.g., as forwarded to the client device 150 at step 306A/306B), a trust level of the message when it was originally scanned, a kind of traffic the message was identified as being (e.g., A2P vs. P2P), and/or the like. It will be appreciated that other and/or different notifications or reports may also be provided.

Figure 6:
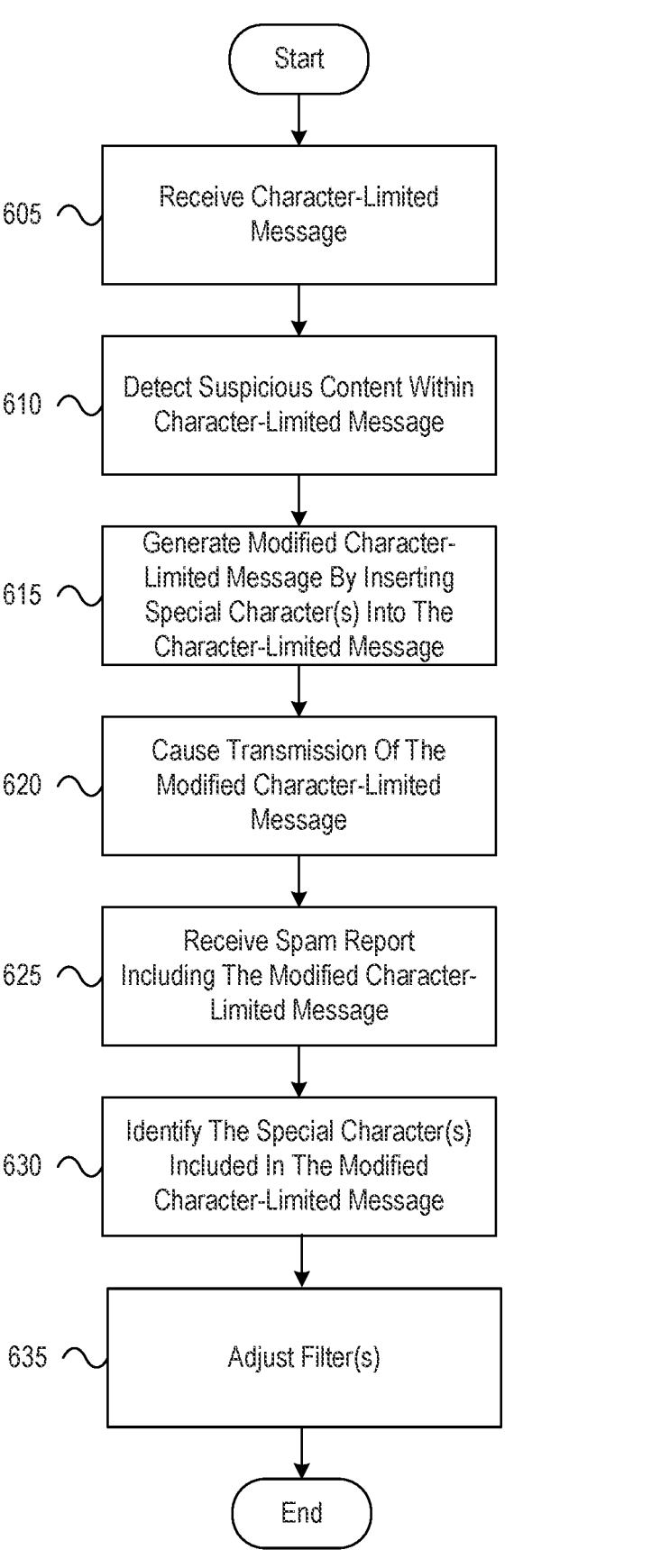
FIG. 6 depicts an illustrative method for detecting and protecting against cybersecurity attacks in accordance with one or more example embodiments.

FIG. 6 depicts an illustrative method for detecting and protecting against cybersecurity attacks in accordance with one or more example embodiments. Referring to FIG. 6, at step 605, a computing platform having at least one processor, a communication interface, and memory may receive a character-limited message sent to a user device (e.g., from a messaging service center, which may receive the messages from a message transmitting device). At step 610, the computing platform may detect that the character-limited message sent to the user device comprises suspicious content. At step 615, the computing platform may generate a modified character-limited message by inserting one or more special characters into the character-limited message. At step 620, the computing platform may cause transmission of the modified character-limited message to the user device (e.g., to a messaging service center, which will forward the modified message(s) on for eventual delivery to a client device). At step 625, the computing platform may receive, from the user device, a spam report that includes the modified character-limited message. At step 630, the computing platform may identify a presence of the one or more special characters included in the modified character-limited message. At step 635, the computing platform may adjust one or more filters based on identifying the presence of the one or more special characters included in the modified character-limited message.

It should be understood that the analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, a character-limited message sent to a user device;
   scan the character-limited message to evaluate the character-limited message for suspicious content;

detect, based on the scan, that the character-limited message sent to the user device comprises suspicious content;

responsive to detecting that the character-limited message sent to the user device comprises the suspicious content, generate a modified character-limited message by selecting and inserting one or more unprintable characters into the character-limited message, wherein:

selecting and inserting the one or more unprintable characters into the character-limited message includes detecting a length of the character-limited message and inserting the one or more unprintable characters based on a number of available unused characters in the character-limited message, the one or more unprintable characters are configured to track the character-limited message comprising the suspicious content and identify a confidence level, indicative of a confidence that the suspicious content is suspicious, and the one or more unprintable characters include different unprintable characters indicating different confidence levels; and cause transmission of the modified character-limited message to the user device.

2. The computing platform of claim 1, wherein the one or more unprintable characters indicate a type of messaging associated with the character-limited message sent to the user device.

3. The computing platform of claim 1, wherein the memory stores additional computer-readable instructions that, when executed by the at least one processor, cause the computing platform to:

prior to detecting that the character-limited message sent to the user device comprises the suspicious content, classify the character-limited message based on message type.

4. The computing platform of claim 1, wherein generating the modified character-limited message by inserting the one or more unprintable characters into the character-limited message further comprises:

prioritizing the one or more unprintable characters for insertion based on one or more criteria; and inserting the one or more unprintable characters based on the prioritization.

5. The computing platform of claim 1, wherein the character-limited message comprises at least one of a short message service (SMS) message or a multimedia messaging service (MMS) message.

6. The computing platform of claim 1, wherein the memory stores additional computer-readable instructions that, when executed by the at least one processor, cause the computing platform to:

detect a presence of the one or more unprintable characters included in the modified character-limited message; and adjust one or more filters based on detecting the presence of the one or more unprintable characters included in the modified character-limited message.

7. The computing platform of claim 6, wherein adjusting the one or more filters comprises modifying one or more filter criteria based on an aggregate of character-limited messages identified as comprising actually suspicious content.

8. The computing platform of claim 6, wherein adjusting the one or more filters comprises allowing more character-limited messages to pass through to the user device.

9. The computing platform of claim 6, wherein the memory stores additional computer-readable instructions that, when executed by the at least one processor, cause the computing platform to:

receive, via the communication interface, an additional character-limited message sent to the user device;

based on the adjusted one or more filters, detect that the additional character-limited message sent to the user device comprises the suspicious content; and based on detecting that the additional character-limited message sent to the user device comprises the suspicious content, execute one or more security actions.

10. The computing platform of claim 9, wherein executing the one or more security actions comprises blocking the additional character-limited message or inserting a warning message into the additional character-limited message.

11. A method, comprising:

at a computing platform comprising at least one processor, a communication interface, and memory:

receiving, by the at least one processor, a character-limited message sent to a user device;

scanning, by the at least one processor, the character-limited message to evaluate the character-limited message for suspicious content;

detecting, by the at least one processor and based on the scanning, that the character-limited message sent to the user device comprises suspicious content;

responsive to detecting that the character-limited message sent to the user device comprises the suspicious content, generating, by the at least one processor, a modified character-limited message by selecting and inserting one or more unprintable characters into the character-limited message, wherein:

selecting and inserting the one or more unprintable characters into the character-limited message includes detecting a length of the character-limited message and inserting the one or more unprintable characters based on a number of available unused characters in the character-limited message, the one or more unprintable characters are configured to track the character-limited message comprising the suspicious content and identify a confidence level indicative of a confidence that the suspicious content is suspicious, and the one or more unprintable characters include different unprintable characters indicating different confidence levels; and causing, by the at least one processor, transmission of the modified character-limited message to the user device.

12. The method of claim 11, wherein the one or more unprintable characters indicate a type of messaging associated with the character-limited message sent to the user device.

13. The method of claim 11, further including:

prior to detecting that the character-limited message sent to the user device comprises the suspicious content, classifying the character-limited message based on message type.

14. The method of claim 11, wherein generating the modified character-limited message by inserting the one or more unprintable characters into the character-limited message further comprises:

prioritizing, by the at least one processor, the one or more unprintable characters for insertion based on one or more criteria; and inserting, by the at least one processor, the one or more unprintable characters based on the prioritization.

15. The method of claim 11, further including:

detecting, by the at least one processor, a presence of the one or more unprintable characters included in the modified character-limited message; and adjusting, by the at least one processor, one or more filters based on detecting the presence of the one or more unprintable characters included in the modified character-limited message.

16. The method of claim 15, wherein adjusting the one or more filters comprises modifying one or more filter criteria based on an aggregate of character-limited messages identified as comprising actually suspicious content.

17. The method of claim 15, wherein adjusting the one or more filters comprises allowing more character-limited messages to pass through to the user device.

18. One or more non-transitory computer-readable media storing instructions that, when executed by a computing platform comprising at least one processor, a communication interface, and memory, cause the computing platform to:

receive, via the communication interface, a character-limited message sent to a user device;

scan the character-limited message to evaluate the character-limited message for suspicious content;

detect, based on the scan, that the character-limited message sent to the user device comprises suspicious content;

responsive to detecting that the character-limited message sent to the user device comprises the suspicious content, generate a modified character-limited message by selecting and inserting one or more unprintable characters into the character-limited message, wherein:

selecting and inserting the one or more unprintable characters into the character-limited message includes detecting a length of the character-limited message and inserting the one or more unprintable characters based on a number of available unused characters in the character-limited message, the one or more unprintable characters are configured to track the character-limited message comprising the suspicious content and identify a confidence level indicative of a confidence that the suspicious content is suspicious, and the one or more unprintable characters include different unprintable characters indicating different confidence levels; and cause transmission of the modified character-limited message to the user device.

19. The one or more non-transitory computer-readable media of claim 18, wherein the one or more unprintable characters indicate a type of messaging associated with the character-limited message sent to the user device.

20. The one or more non-transitory computer-readable media of claim 18, wherein the memory stores additional computer-readable instructions that, when executed by the at least one processor, cause the computing platform to:

prior to detecting that the character-limited message sent to the user device comprises the suspicious content, classify the character-limited message based on message type.

* * * * *